(12) United States Patent
Oka et al.

(10) Patent No.: US 12,483,550 B2
(45) Date of Patent: Nov. 25, 2025

(54) AUTHENTICATION SYSTEM

(71) Applicants: TOYOTA JIDOSHA KABUSHIKI KAISHA, Toyota (JP); Toyota Financial Services Corporation, Aichi (JP)

(72) Inventors: Naoya Oka, Nagakute (JP); Hitoshi Kageyama, Tokyo (JP); Feng Xu, Yokohama (JP); Dai Sasaki, Yokohama (JP); Bharath Tv, Tokyo (JP)

(73) Assignees: TOYOTA JIDOSHA KABUSHIKI KAISHA, Toyota (JP); Toyota Financial Services Corporation, Aichi (JP)

( * ) Notice: Subject to any disclaimer, the term of this patent is extended or adjusted under 35 U.S.C. 154(b) by 260 days.

(21) Appl. No.: 17/720,821

(22) Filed: Apr. 14, 2022

(65) Prior Publication Data

US 2022/0337583 A1    Oct. 20, 2022

(30) Foreign Application Priority Data

Apr. 20, 2021    (JP) ................................ 2021-070925

(51) Int. Cl.
    *H04L 9/40*    (2022.01)
(52) U.S. Cl.
    CPC ................ *H04L 63/0853* (2013.01)
(58) Field of Classification Search
    CPC ............. H04L 63/0853; H04L 63/0281; H04L 63/0815; H04L 63/0884; H04L 67/56;
    (Continued)

(56) References Cited

U.S. PATENT DOCUMENTS 10,999,362 B1 * 5/2021 Kudrin ................ H04L 67/1097
11,159,498 B1 * 10/2021 Casu ..................... H04L 9/0825
(Continued)

FOREIGN PATENT DOCUMENTS

CN    112165448 A  *  1/2021 ......... H04L 63/0807
JP    2012-164191 A    8/2012
(Continued)

OTHER PUBLICATIONS

Y.-W. Chang and P.-C. Lin, "SSOV: A Single Sign-on Protocol for Accessing Vehicular Application Services with the Support of Secret Credential Management System," 2020 International Computer Symposium (ICS), Tainan, Taiwan, 2020, pp. 437-442 (Year: 2020).*

(Continued)

*Primary Examiner* — Michael R Vaughan
(74) *Attorney, Agent, or Firm* — Sughrue Mion, PLLC

(57) ABSTRACT

An authentication system includes service providing systems, a global ID platform, and a terminal device owned by a user. The first service providing system includes a first authentication server and a first back-end server. The first back-end server provides a first service. The second service providing system includes a second authentication server and a second back-end server. The second back-end server provides a third service. The user is a member of the first service and has a user ID of the first service. When the user requests global login to the third service, the global ID platform relays the request from the second authentication server to the first authentication server and relays an authentication result, returned by the first authentication server for the request, from the first authentication server to the second authentication server.

6 Claims, 12 Drawing Sheets

(58) Field of Classification Search
CPC ... H04L 67/563; H04L 63/0807; H04L 67/12; H04L 63/08; H04L 63/102; G06F 21/41; H04W 12/06; H04W 4/40
See application file for complete search history.

(56) References Cited

U.S. PATENT DOCUMENTS

| | | | |
|---|---|---|---|
| 2004/0181662 A1* | 9/2004 | Kanai | H04L 63/08 713/155 |
| 2013/0055257 A1* | 2/2013 | Yamashita | G06F 9/5077 718/1 |
| 2013/0145173 A1* | 6/2013 | Shablygin | G06F 21/34 713/185 |
| 2017/0359354 A1* | 12/2017 | Matsugashita | H04L 63/08 |
| 2020/0076791 A1 | 3/2020 | Kishimoto | |
| 2021/0165871 A1* | 6/2021 | Jensen | G06F 21/6218 |
| 2021/0234927 A1* | 7/2021 | Sohn | G16Y 40/30 |
| 2021/0264053 A1* | 8/2021 | Shortell | G06F 21/31 |
| 2022/0150237 A1* | 5/2022 | Canfield | H04L 63/104 |
| 2022/0303269 A1* | 9/2022 | Maruyama | G06F 21/45 |
| 2022/0337583 A1 | 10/2022 | Oka et al. | |
| 2023/0131814 A1* | 4/2023 | Brindley | H04L 63/0815 726/9 |

FOREIGN PATENT DOCUMENTS

| | | |
|---|---|---|
| JP | 2020-036234 A | 3/2020 |
| JP | 7453179 B2 | 3/2024 |
| WO | WO-2020232336 A1 * 11/2020 | ......... G06Q 20/3276 |

OTHER PUBLICATIONS

Shaofeng Yu, et al., "Identity Manage Interoperation Based on OpenID," Advances in Swarm Intelligence, 2012, pp. 360-367.

Jianyong Chen, et al., "Trust relationship establishment based on the existing trust", 2010 Second International Workshop on Education Technology and Computer Science, IEEE, Piscataway, NJ, USA, 2010, pp. 141-144.

N. Sakimura, et al., "OpenID Connect Core 1.0 incorporating errata set 1", ITU-T Draft; Study Period 2017-2020; Study Group 20, International Telecommunication Union, Geneva; CH, vol. 3/20, 2018, pp. 1-137.

* cited by examiner

AUTHENTICATION SYSTEM

CROSS-REFERENCE TO RELATED APPLICATION

This application claims priority to Japanese Patent Application No. 2021-070925 filed on Apr. 20, 2021, incorporated herein by reference in its entirety.

BACKGROUND

1. Technical Field

The disclosure relates to an authentication system.

2. Description of Related Art

Japanese Unexamined Patent Application Publication No. 2020-036234 (JP2020-036234 A) describes an authorization system that includes an authentication and authorization server, a resource server that provides Web services, and a client apparatus. In the authorization system, a client receives the provision of a Web service from the resource server by using an access token acquired from the authentication and authorization server.

SUMMARY

In recent years, ID linkage that enables a client to log in to multiple services on a network by using one ID has become a focus of attention. ID linkage is achieved by using a protocol, such as Open ID Connect (OIDC).

If there is a large number of services of which the IDs are linked, there is also a large number of authentication servers corresponding to service servers. For this reason, when authentication servers are intended to be linked by using a protocol of OIDC, the system can be complicated. A complicated system leads to an increase in time and cost required to develop and maintain the system.

The disclosure implements linkage among authentication servers with a relatively easy configuration.

An aspect of the disclosure relates to an authentication system. The authentication system includes a terminal device configured to be operated by a user, a first server configured to store identification information for identifying the user, a second server configured to not store the identification information, and a platform configured to relay information between the first server and the second server. The platform is configured to, when there is an authentication request of the user from the terminal device to the second server, relay the authentication request from the second server to the first server, and relay an authentication result, returned by the first server for the authentication request, from the first server to the second server.

With the above configuration, the platform relays information between the first server and the second server. Therefore, the system in which each of the first server and the second server is able to exchange information with the platform just needs to be constructed. Thus, in comparison with the case where a system in which servers exchange information with each other is constructed, the authentication system has an easy configuration.

In the above aspect, the terminal device may include a display unit. The terminal device may be configured to display a page for authentication on the display unit, and the page may contain a first button and a second button. When the first button is pressed, authentication of the user may be performed by the second server. When the second button is pressed, the authentication request may be relayed by the platform from the second server to the first server, and authentication of the user may be performed by the first server.

With the above configuration, the first button for direct authentication by the second server and the second button for authentication by the first server through the relay of information by the platform are displayed on the display unit of the terminal device. The user is able to visually recognize that there are two authentication methods, so it is possible to improve the usability of the user.

In the above aspect, the first server may be configured to store user information on the user, and the second server may be configured to not store the user information. The platform may be configured to, when the authentication result indicates that authentication is successful, transmit, to the terminal device, a consent request for consent to share the user information to the second server, and, when the consent to the consent request is obtained from the terminal device, relay the user information from the first server to the second server.

With the above configuration, the platform also relays transmission of the user information. With the configuration in which the platform relays information exchanged between the first server and the second server, the authentication system has an easy configuration as compared to the case where the system in which servers exchange information with each other is constructed.

In the above aspect, the second server may be configured to, when the consent to the consent request is obtained from the terminal device, transmit an authorization code to the terminal device.

In the above aspect, the terminal device may be configured to transmit the authorization code to the second server and acquire a token from the second server. The token may include at least an access token and an ID token.

According to the aspect of the disclosure, linkage among authentication servers is implemented with a relatively easy configuration.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
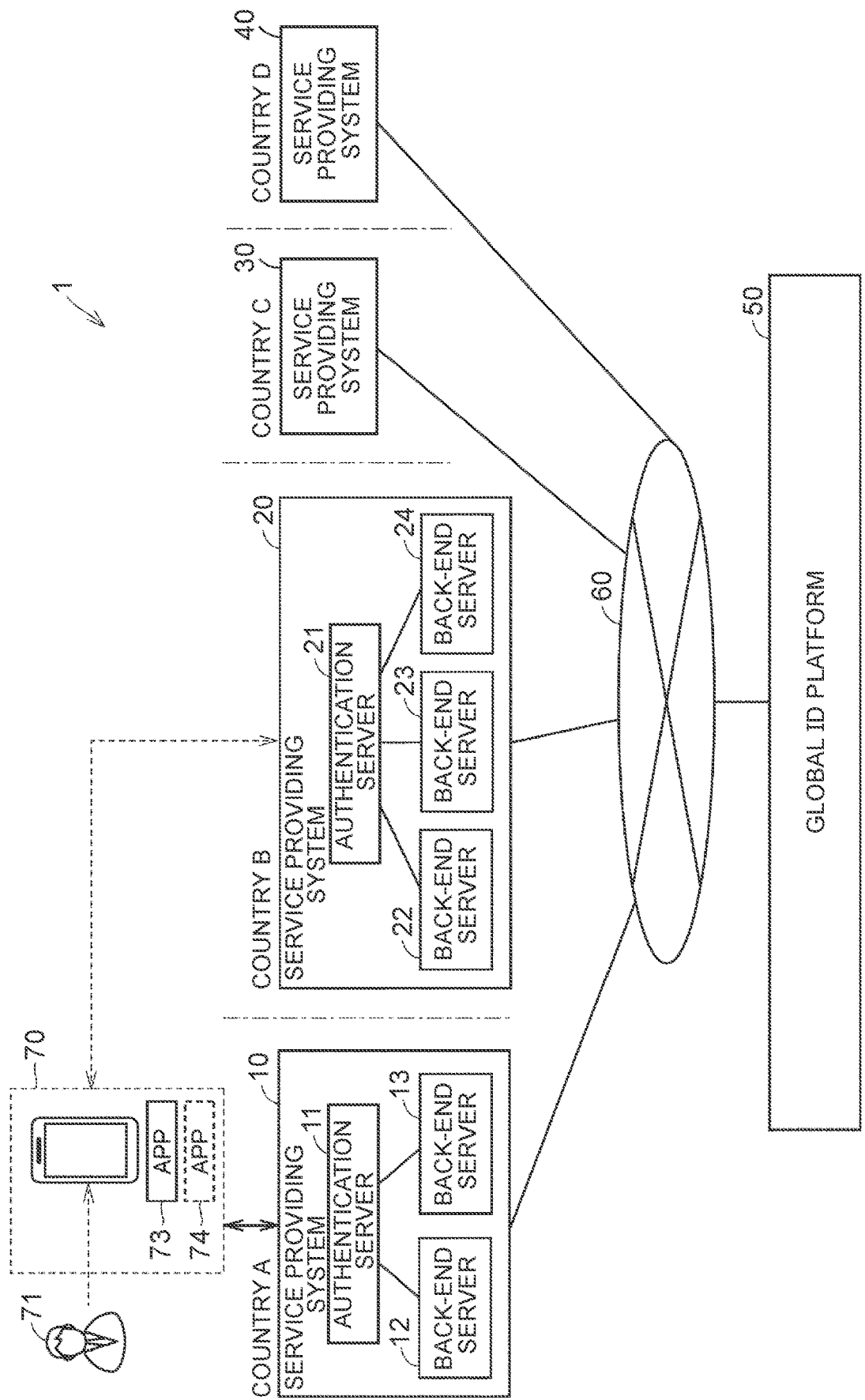
FIG. 1 is a diagram showing the schematic configuration of an authentication system according to an embodiment.

Hereinafter, an embodiment of the disclosure will be described in detail with reference to the accompanying drawings. Like reference signs denote the same or corresponding portions in the drawings, and the description thereof will not be repeated.

FIG. 1 is a diagram showing a schematic configuration of an authentication system 1 according to the present embodiment. The authentication system 1 according to the present embodiment is a system for linking IDs (user IDs) among services operated in different countries. The authentication system 1 enables linkage of IDs with a relatively easy configuration by exchanging information via a common platform among authentication servers in different countries.

As shown in FIG. 1, the authentication system 1 includes service providing systems 10, 20, 30, 40, a global ID platform 50, and a terminal device 70 owned by a user 71. The service providing systems 10, 20, 30, 40, the global ID platform 50, and the terminal device 70 are connected via a network 60, such as the Internet, so as to be able to communicate with one another.

The service providing systems 10, 20, 30, 40 are systems that respectively provide services on vehicles in countries A to D.

The service providing system 10 provides services on vehicles in country A. In the present embodiment, the service providing system 10 provides two types of services, that is, a first service and a second service. The first service is a subscription service with which a user is able to use a vehicle during the term of a contract when the user pays a fixed amount every month. The fixed amount for the first service includes, for example, the maintenance fee and insurance fee of a vehicle. The second service is a carsharing service with which members share specific vehicles. The services provided by the service providing system 10 are not limited to the first service and the second service. The service providing system 10 may provide another service in addition to the first service and the second service, instead of the first service and the second service, or instead of any one of the first service and the second service.

The service providing system 10 includes an authentication server 11 and back-end servers 12, 13. The authentication server 11 is a server that performs authentication of users who are members of the first service and/or the second service. The authentication server 11 has a function as an open ID provider. The detailed configuration of the authentication server 11 will be described later with reference to FIG. 2. The authentication server 11 corresponds to one example of a first server according to the disclosure.

The back-end server 12 is a server that provides the first service. A service provider (not shown) of the back-end server 12 provides an application 73 for receiving the provision of the first service in a marketplace or the like. The back-end server 12 receives user operation via the application 73 from a terminal device (for example, a smartphone, a personal computer, or the like) in which the application 73 is installed and executes a process for providing a service according to the operation.

The back-end server 13 is a server that provides the second service. A service provider (not shown) of the back-end server 13 provides an application (not shown) for receiving the provision of the second service in a marketplace or the like. The back-end server 13 receives user operation via the application from a terminal device in which the application for receiving the provision of the second service is installed and executes a process for providing a service according to the operation.

The terminal device 70 is a smartphone owned by the user 71. The terminal device 70 is not limited to a smartphone and may be, for example, a desktop personal computer (PC), a notebook PC, a tablet terminal, or another information processing terminal that has a communication function. The application 73 for using the first service is installed in the terminal device 70 according to the present embodiment.

The user 71 is a user who is a member of the first service provided by the back-end server 12. The user 71 has an ID (user ID) and a password for logging in to the first service. The password is, for example, set by the user 71 at the time of signing up to become a member of the first service. The user 71 launches the application 73 on the terminal device 70, opens a login screen to the first service (back-end server 12), and enters the user ID and the password on the displayed login screen. The input information is sent to the authentication server 11. A process of authenticating the user ID is executed by the authentication server 11. When the authentication is successful, the user 71 is enabled to receive the provision of the first service from the back-end server 12.

The service providing system 20 provides services on vehicles in country B. In the present embodiment, the service providing system 20 provides three types of services, that is, a third service, a fourth service, and a fifth service. The third service is a subscription service similar to the first service. The fourth service is a carsharing service similar to the second service. The fifth service is a carpooling service with which a plurality of persons shares a vehicle during commute time or the like. The services provided by the service providing system 20 are not limited to the third service, the fourth service, and the fifth service. The service providing system 20 may provide another service in addition to the third service, the fourth service, and the fifth service, instead of the third service, the fourth service, and the fifth service, or instead of any one of the third service, the fourth service, and the fifth service.

The service providing system 20 includes an authentication server 21 and back-end servers 22, 23, 24. The authentication server 21 is a server that performs authentication of users who are members of the third service, the fourth service, and/or the fifth service. The authentication server 21 has a function as an open ID provider. The detailed configuration of the authentication server 21 will be described later with reference to FIG. 3. The authentication server 21 corresponds to one example of a second server according to the disclosure.

The back-end server 22 is a server that provides the third service. A service provider (not shown) of the back-end server 22 provides an application 74 for receiving the provision of the third service in a marketplace or the like. The back-end server 22 receives user operation via the application 74 from a terminal device in which the application 74 is installed and executes a process for providing a service according to the operation.

The back-end server 23 is a server that provides the fourth service. A service provider (not shown) of the back-end server 23 provides an application (not shown) for receiving the provision of the fourth service in a marketplace or the like. The back-end server 23 receives user operation via an application from a terminal device in which the application for receiving the provision of the fourth service is installed and executes a process for providing a service according to the operation.

The back-end server 24 is a server that provides the fifth service. A service provider (not shown) of the back-end server 24 provides an application (not shown) for receiving the provision of the fifth service in a marketplace or the like. The back-end server 24 receives user operation via an application from a terminal device in which the application for receiving the provision of the fifth service is installed and executes a process for providing a service according to the operation.

The service providing system 30 provides services on vehicles in country C. The service providing system 30 includes an authentication server and at least one back-end server although these are not shown.

The service providing system 40 provides services on vehicles in country D. The service providing system 40 includes an authentication server and at least one back-end server although these are not shown.

Figure 2:
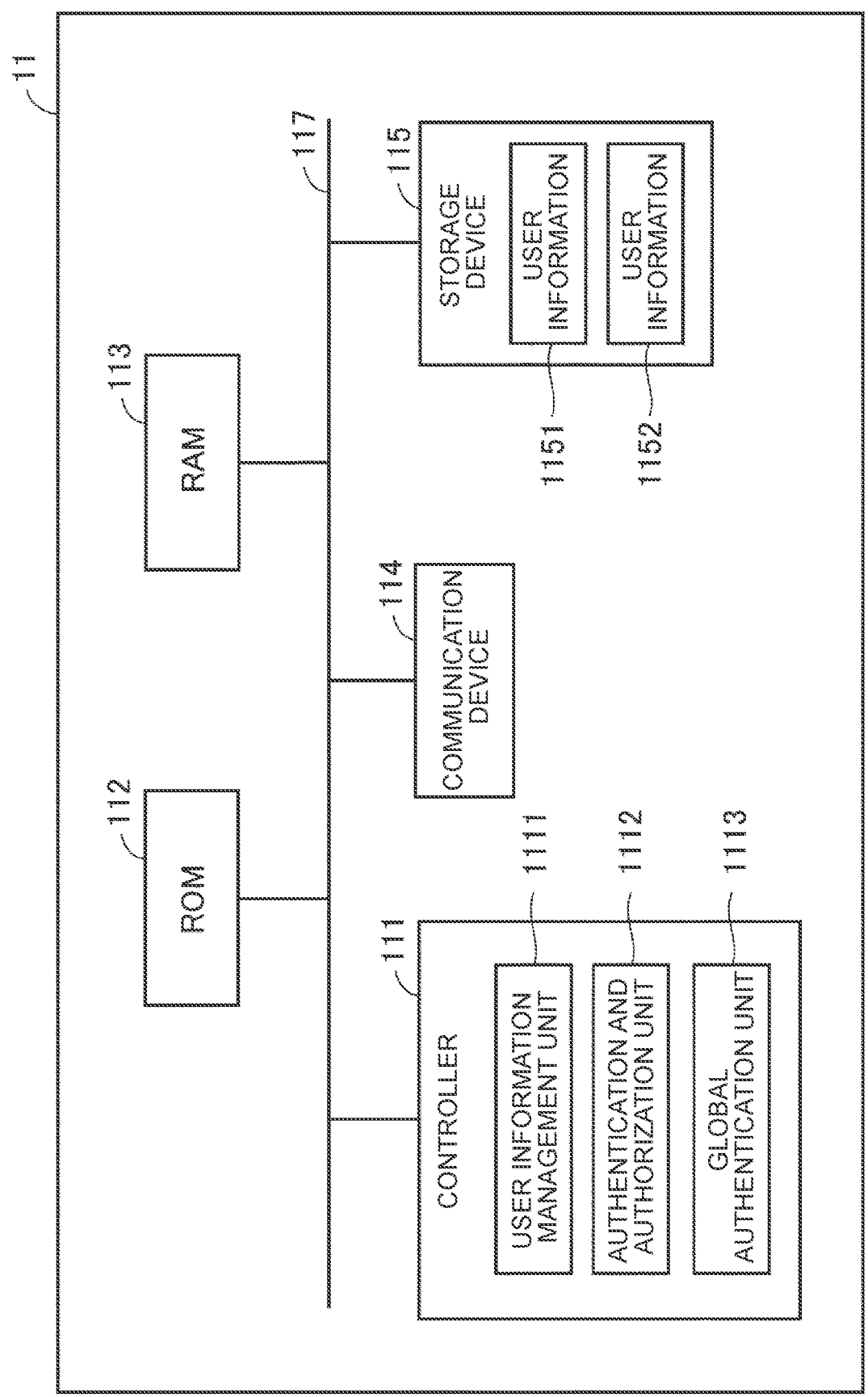
FIG. 2 is a diagram for illustrating the configuration of an authentication server.

FIG. 2 is a diagram for illustrating the configuration of the authentication server 11. As shown in FIG. 2, the authentication server 11 includes a controller 111, a read only memory (ROM) 112, a random access memory (RAM) 113, a communication device 114, and a storage device 115. The controller 111, the ROM 112, the RAM 113, the communication device 114, and the storage device 115 are connected to a bus 117.

The controller 111 is made up of, for example, an integrated circuit that includes a central processing unit (CPU). The controller 111 expands various programs stored in the ROM 112 onto the RAM 113 and runs the programs. Various programs include an operating system and the like. The RAM 113 functions as a working memory and temporarily stores various data required to run various programs. The controller 111, for example, manages information on users (hereinafter, also referred to as "user information") who are members of the first service or the second service, executes an authentication process, or executes an authorization process.

The communication device 114 includes an interface for connection with the network 60 and is configured to be capable of communicating with external devices via the network 60. Examples of the external devices include the global ID platform 50 and the terminal device 70.

The storage device 115 is configured to include a storage medium, such as a hard disk drive and a flash memory. The storage device 115 stores pieces of user information 1151, 1152. The user information 1151 is information on users who are members of the first service. The user information 1152 is information on users who are members of the second service. The user information 1151 includes user IDs assigned at the time of signing up to become members of the first service, and private information input by users at the time of signing up to become members. The private information includes pieces of information, such as name, mail address, phone number, address, and password. A password is, for example, set by a user or set by the controller 111 at the time of signing up to become a member. The user information 1152 includes user IDs assigned at the time of signing up to become members of the second service, and private information input by users at the time of signing up to become members. A storage device that stores the user information 1151 and a storage device that stores the user information 1152 may be provided separately.

The controller 111 includes the user information management unit 1111, an authentication and authorization unit 1112, and a global authentication unit 1113. The controller 111, for example, functions as the user information management unit 1111, the authentication and authorization unit 1112, and the global authentication unit 1113 by running programs stored in the ROM 112. The user information management unit 1111, the authentication and authorization unit 1112, and the global authentication unit 1113 may be implemented by, for example, dedicated hardware (electronic circuit).

A user information management unit 1111 assigns a user ID to a user who is a member of the first service or the second service according to a service (the first service or the second service). More specifically, the user information management unit 1111 assigns a user ID for the first service to a user who is a member of the first service. The user information management unit 1111 stores the assigned user ID for the first service and the input private information in the storage device 115 as the user information 1151. The user information management unit 1111 assigns a user ID for the second service to a user who is a member of the second service. The user information management unit 1111 stores the assigned user ID for the second service and the input private information in the storage device 115 as the user information 1152.

The user information management unit 1111 determines whether a user signs up to become a member of the first service or a member of the second service in accordance with via which one of the application 73 corresponding to the first service and the application corresponding to the second service is used to sign up to become a member. When, for example, the application 73 corresponding to the first service is used to sign up to become a member, the user information management unit 1111 determines that it is to sign up to become a member of the first service and stores the input information as the user information 1151. To determine the correspondence relationship between an application and a service, a service ID for identifying each of the first service and the second service may be introduced, and the service ID may be assigned to the associated application, service, and user information. In this case, the user information management unit 1111 is able to identify a service to sign up to become a member from the service ID assigned to the application used to sign up to become a member.

When the user 71 operates to log in to the first service or the second service via a corresponding one of the applications, the authentication and authorization unit 1112 checks the validity of the input user ID. When, for example, the authentication and authorization unit 1112 receives a request to log in to the first service via the application 73 from the terminal device 70 (browser) of the user 71, the authentication and authorization unit 1112 causes the terminal device 70 to display a login screen to the first service. When a user ID and a password are entered on the login screen, the authentication and authorization unit 1112 performs authentication of the user 71 (user ID) by consulting the user information 1151 stored in the storage device 115 for the user ID and the password, and performs authentication of the user 71 (user ID). The authentication and authorization unit 1112 may recognize that user information to be consulted is the user information 1151 by identifying a service ID based on the application 73 operated by the user 71.

When the authentication and authorization unit 1112 determines the validity of the user ID, the authentication and authorization unit 1112 returns an authorization code to the terminal device 70. When the authentication and authorization unit 1112 receives a token request attached with the authorization code from the terminal device 70, the authentication and authorization unit 1112 returns a token to the application. The token includes, for example, an access token, an ID token, and a refresh token. For example, the application 73 having received a token is able to access the back-end server 12 by using the access token and the ID token. Thus, the user 71 is able to receive the provision of the first service.

The global authentication unit 1113 functions to link IDs between a service provided by the service providing system 10 (the first service or the second service) and services provided by the other service providing systems 20, 30, 40. Although described in detail later, when there is a request to log in to services provided by the other service providing systems 20, 30, 40 by using the user ID of the service (the first service or the second service) provided by the service providing system 10, the global authentication unit 1113 checks the validity of the user ID. In the following description, a login to a service provided by a service providing system by using a user ID of another service provided by another service providing system is also referred to as global login.

Figure 3:
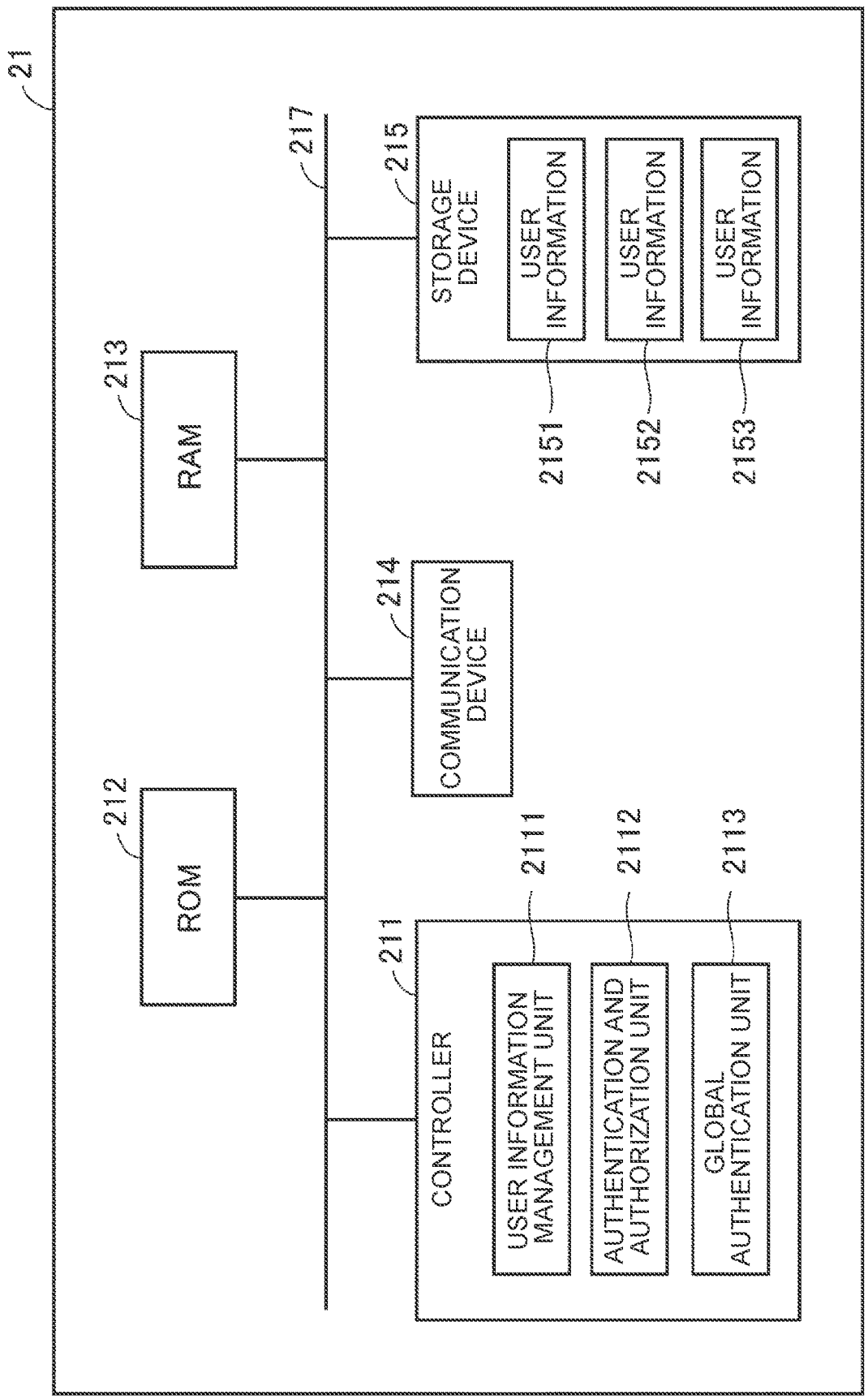
FIG. 3 is a diagram for illustrating the configuration of another authentication server.

FIG. 3 is a diagram for illustrating the configuration of the authentication server 21. As shown in FIG. 3, the authentication server 21 includes a controller 211, a read only memory (ROM) 212, a random access memory (RAM) 213, a communication device 214, and a storage device 215. The controller 211, the ROM 212, the RAM 213, the communication device 214, and the storage device 215 are connected to a bus 217. The controller 211, the ROM 212, the RAM 213, the communication device 214, and the storage device 215 are basically respectively similar to the controller 111, the ROM 112, the RAM 113, the communication device 114, and the storage device 115 of the authentication server 11 except for information stored in the storage device 215, so the description thereof will not be repeated.

The storage device 215 stores pieces of user information 2151, 2152, 2153. The user information 2151 is information on users who are members of the third service. The user information 2152 is information on users who are members of the fourth service. The user information 2153 is information on users who are members of the fifth service.

Each of the authentication servers of the service providing systems 30, 40 basically has a similar configuration to that of the authentication servers 11, 21 of the service providing systems 10, 20. Therefore, the detailed description of the authentication server of each of the service providing systems 30, 40 will not be repeated.

Next, the procedure in which the user 71 who is a member of the first service logs in to the first service will be described. The user 71 launches the application 73 on the terminal device 70 in which the application 73 is installed, and logs in to the first service.

Figure 4:
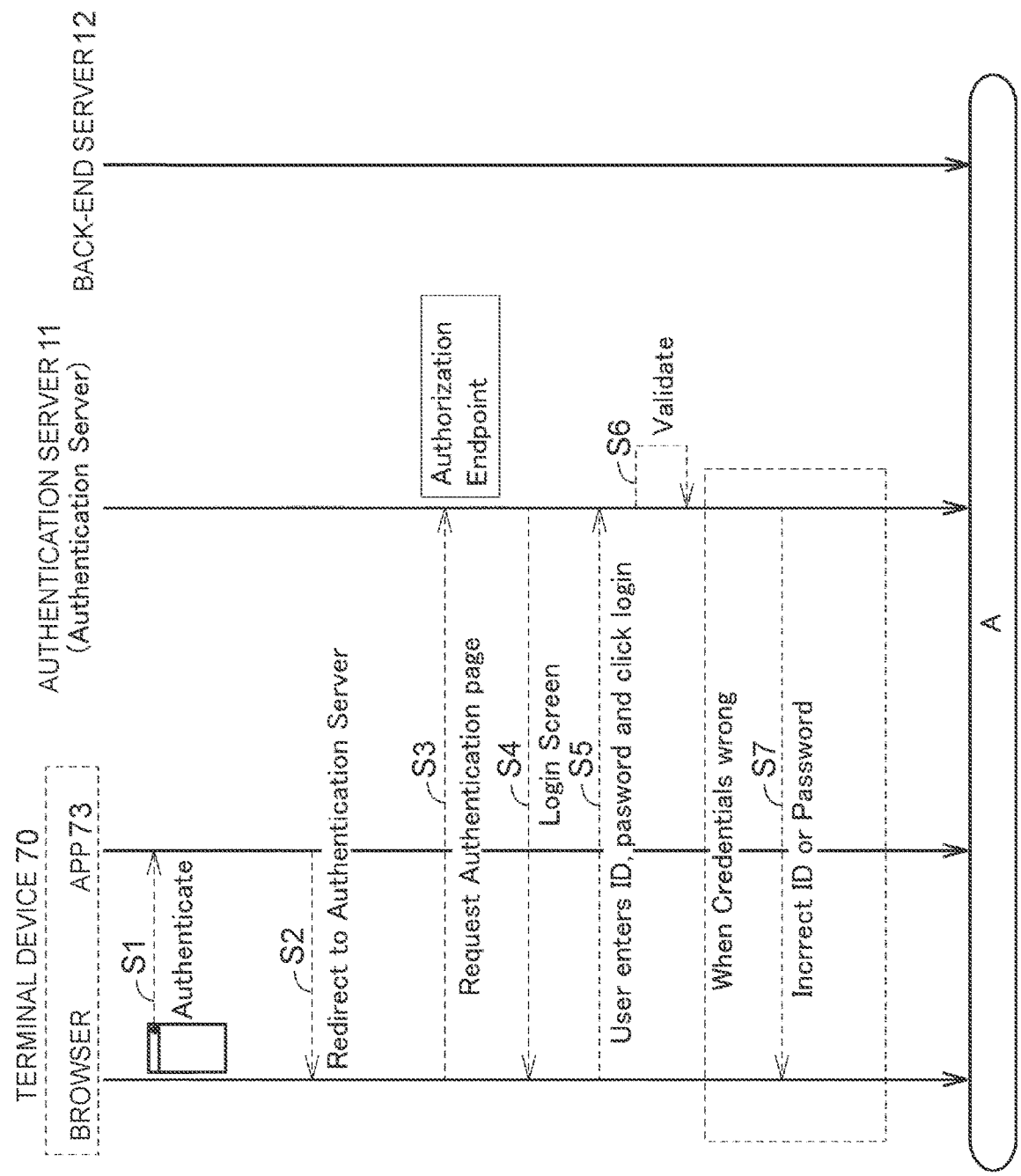
FIG. 4 is a flowchart (part 1) showing the procedure of a login process to a first service (back-end server)
Figure 5:
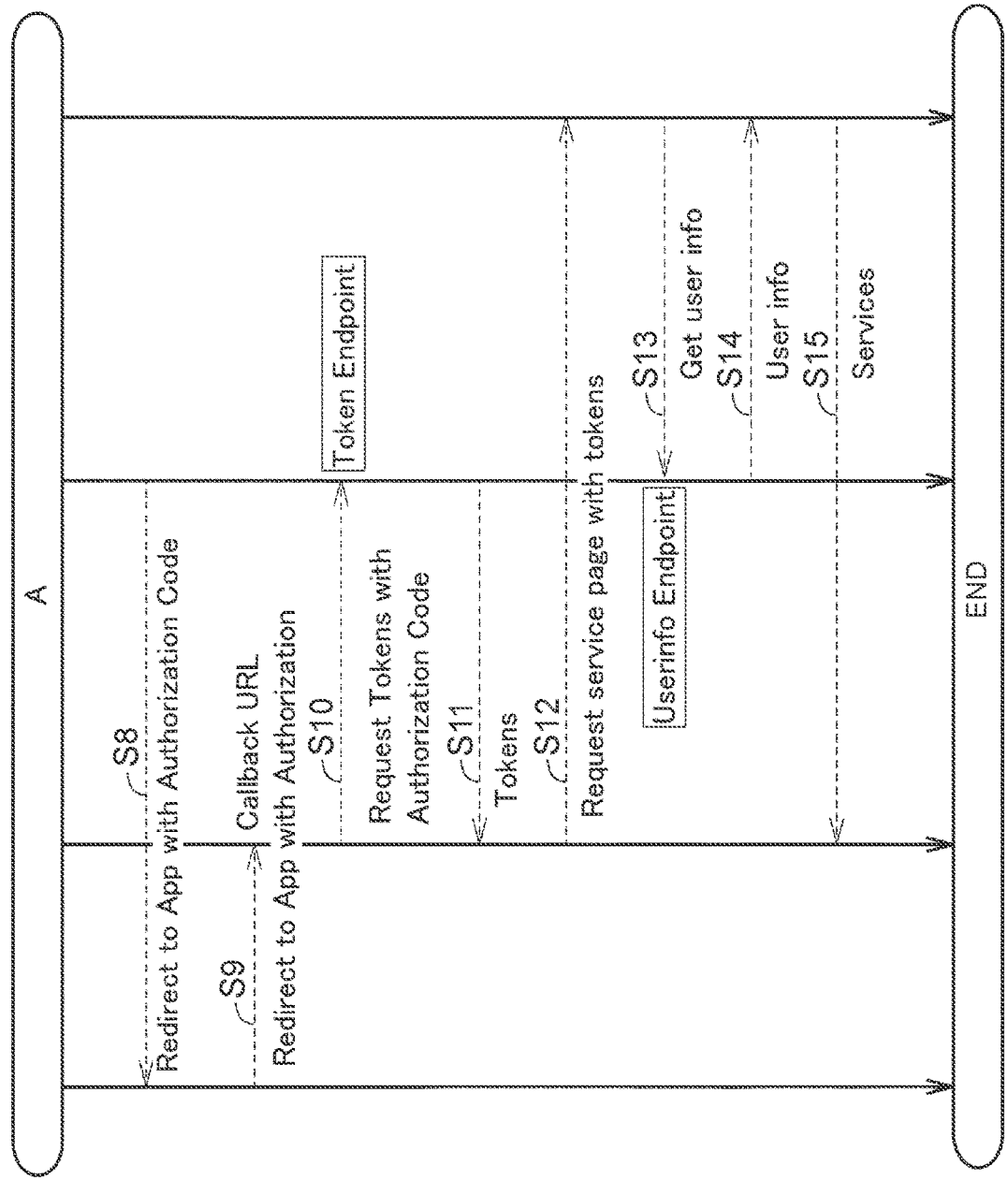
FIG. 5 is a flowchart (part 2) showing the procedure of the login process to the first service (back-end server)

FIG. 4 and FIG. 5 are flowcharts showing the procedure of a process of logging in to the first service (back-end server 12). The processes of the flowcharts of FIG. 4 and FIG. 5 are started when the user 71 launches the application 73 on the terminal device 70. Steps (hereinafter, step is abbreviated as "S") in the flowcharts shown in FIG. 4 and FIG. 5 illustrate the case implemented by software processing on the terminal device 70, the authentication server 11 (the user information management unit 1111 and the authentication and authorization unit 1112), and the back-end server 12. Alternatively, one or some or all of the steps may be implemented by hardware (electronic circuit) prepared in the terminal device 70, the authentication server 11, and the back-end server 12.

In S1, the user 71 launches the application 73 by operating the terminal device 70, and performs an operation for displaying a login screen (a page for transmitting an authentication request) on the display screen of the terminal device 70. The application 73 receives the operation.

When the application 73 receives the operation for displaying the login screen in S2 and S3, the application 73 makes a request of the authentication server 11 to display the login screen via a browser of the terminal device 70. Specifically, in S2, the application 73 opens the browser of the terminal device 70 and redirects the browser to an authorization endpoint of the authentication server 11. In S3, the browser makes a request of the authorization endpoint of the authentication server 11 to display the login screen.

In S4, the authentication server 11 checks the details of the request and returns the login screen to the browser. Thus, the login screen to the first service (back-end server 12) is displayed on the browser.

In S5, the user 71 enters a user ID and a password on the login screen and presses a login button. Thus, together with the user ID and the password, an authentication request is sent from the browser to the authentication server 11.

Figure 6:
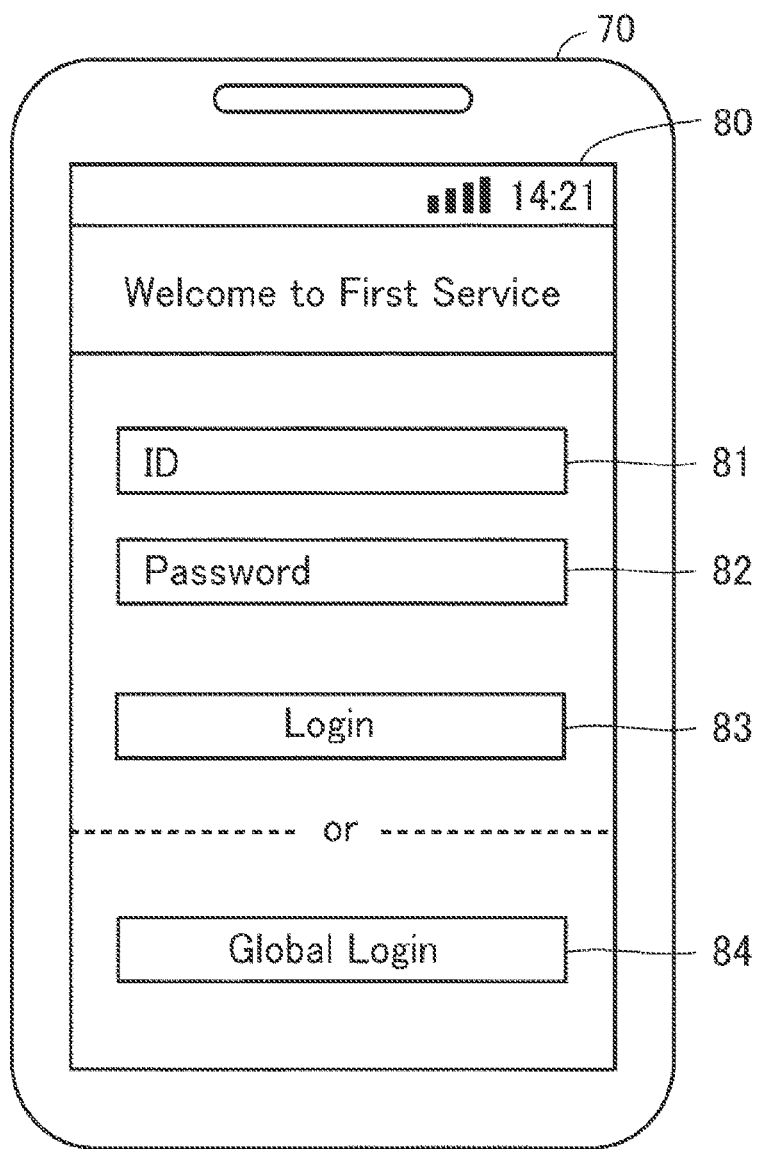
FIG. 6 is a view showing an example of a login screen for the first service, displayed on a terminal device.

FIG. 6 is a view showing an example of the login screen for the first service, displayed on the terminal device 70. A user ID entry field 81, a password entry field 82, a login button 83, and a global login button 84 are displayed on a display unit 80 of the terminal device 70. The user 71 enters a user ID and a password respectively in the user ID entry field 81 and the password entry field 82 and presses the login button 83. Thus, together with the entered user ID and password, an authentication request is sent from the browser to the authentication server 11. In other words, the login button 83 is a button for direct authentication by the authentication server 11.

The global login button 84 is used when a request to log in to the first service by using the user ID of a service other than the first service is issued. The details of the global login button 84 will be described later. In other words, the global login button 84 is a button for authentication by an authentication server other than the authentication server 11. The login button 83 corresponds to one example of a first button according to the disclosure. The global login button 84 corresponds to one example of a second button according to the disclosure.

Referring back to FIG. 4 and FIG. 5, in S6, the authentication server 11 checks the entered user ID and password. As a result of the check, when at least one of the user ID and the password is incorrect, the authentication server 11 executes the process of S7. As a result of the check, when the user ID and the password are correct, the authentication server 11 executes the process of S8.

In S7, the authentication server 11 returns, to the browser, a page showing that at least one of the user ID and the password is incorrect. When the page is displayed on the browser, the user 71 is able to recognize the incorrect entry.

In S8, the authentication server 11 redirects the browser to a callback URL with an authorization code. A transition destination of the callback URL is the application 73.

In S9, the browser accesses the application 73 that is the transition destination of the callback URL with the authorization code. Thus, the authorization code is transferred to the application 73.

In S10, the application 73 sends a token request to a token endpoint of the authentication server 11 with the authorization code received in S9.

In S11, the authentication server 11 checks the details of the token request and transmits tokens to the application 73.

The tokens sent from the authentication server 11 to the application 73 include, for example, an access token, an ID token, and a refresh token.

In S12, the application 73 makes a request of the back-end server 12 for the provision of the first service with the access token and the ID token.

In S13, as the back-end server 12 receives the access token and the ID token, the back-end server 12 transmits the access token and the ID token to a user information endpoint of the authentication server 11.

In S14, the authentication server 11 checks the access token and the ID token and returns user information to the back-end server 12.

In S15, the back-end server 12 starts providing the service to the user 71.

When the user 71 receives authentication from the authentication server 11 as described above, the user 71 is able to log in to the first service of which the user 71 is a member and receive the provision of the first service from the back-end server 12.

Referring back to FIG. 1, the global ID platform 50 is a platform for linking IDs among a plurality of services across countries. The global ID platform 50 has a function of relaying information. Correspondence information that associates a service (back-end server) with an authentication server is stored in the global ID platform 50. The correspondence information is information that associates a service with an authentication server that authenticates a user who makes a request to log in to the service. Specifically, in the correspondence information, the first service and the authentication server 11 are associated with each other. In the correspondence information, the second service and the authentication server 11 are associated with each other. In the correspondence information, the third service and the authentication server 21 are associated with each other. In the correspondence information, the fourth service and the authentication server 21 are associated with each other. In the correspondence information, the fifth service and the authentication server 21 are associated with each other. The global ID platform 50 identifies a destination to relay information based on the correspondence information.

The global ID platform 50 allows a login (global login) to a service provided by a service providing system by using a user ID of another service provided by another service providing system by relaying information between each of the service providing systems 10, 20, 30, 40 and the terminal device 70. In other words, once the user 71 signs up to become a member of one service provided by a service providing system, the user 71 is able to access a service provided by another service providing system by using the user ID and use the service without signing up to become a member of the service provided by the other service providing system.

For example, in order for the user 71 to use the third service provided by the service providing system 20 in country B when the user 71 visits country B, the user 71 needs to install the application 74 associated with the third service in the terminal device 70, enter private information of the user 71 on a member sign up page, and sign up to become a member of the third service. Signing up to become a member of each service to use is burdensome for the user 71, takes time and effort, and impairs the convenience of the user 71.

For example, it is conceivable to link IDs among authentication servers of service providing systems by constructing a system for ID linkage among the authentication servers of the service providing systems using a protocol, such as OIDC. However, as a large number of authentication servers are linked, the system may be complicated. A complicated system leads to an increase in time and cost required to develop and maintain the system.

Therefore, in the authentication system 1 according to the present embodiment, a global login that omits a direct exchange of information among authentication servers is allowed by providing the global ID platform 50 that relays information. With this configuration, for an authentication server of a service providing system, the authentication server is enabled to link IDs with other authentication servers through information processing with the global ID platform 50. In other words, a system capable of exchanging information between each authentication server and the global ID platform 50 just needs to be constructed, so it is possible to simplify the configuration of the system as compared to when a system that links IDs by directly exchanging information between authentication servers of service providing systems is constructed. Hereinafter, a global login will be specifically described. Hereinafter, as one example, an example in which the user 71 logs in to the third service provided by the service providing system 20 by using the user ID for the first service is assumed. The user 71 is not a member of the third service. Therefore, the user ID for the third service has not been issued for the user 71.

Initially, the user 71 installs the application 74 for using the third service in the terminal device 70. When the user 71 launches the application 74 on the terminal device 70, processes shown in FIG. 7 to FIG. 9 are started.

Figure 7:
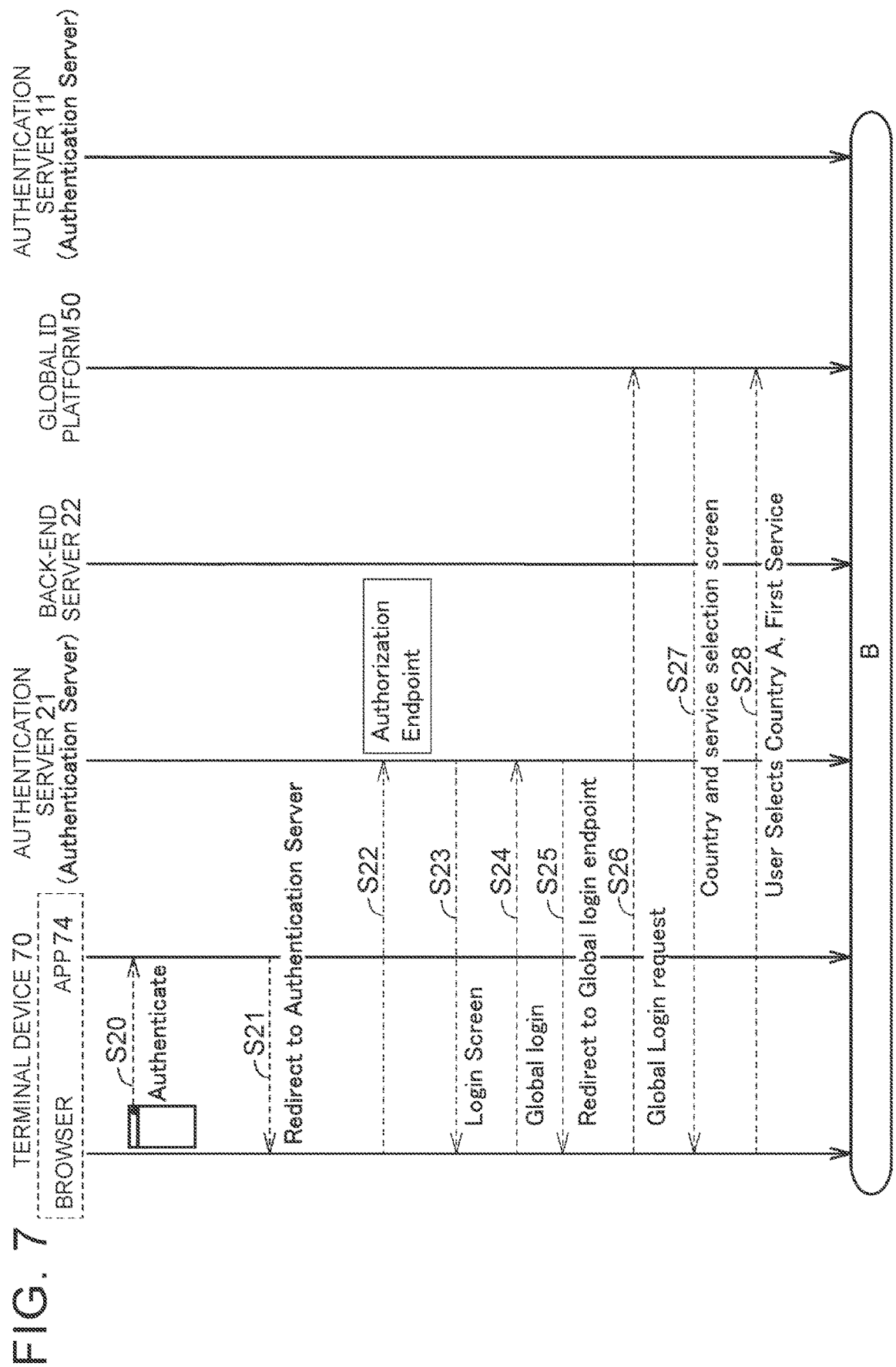
FIG. 7 is a flowchart (part 1) showing the procedure of a global login process.
Figure 8:
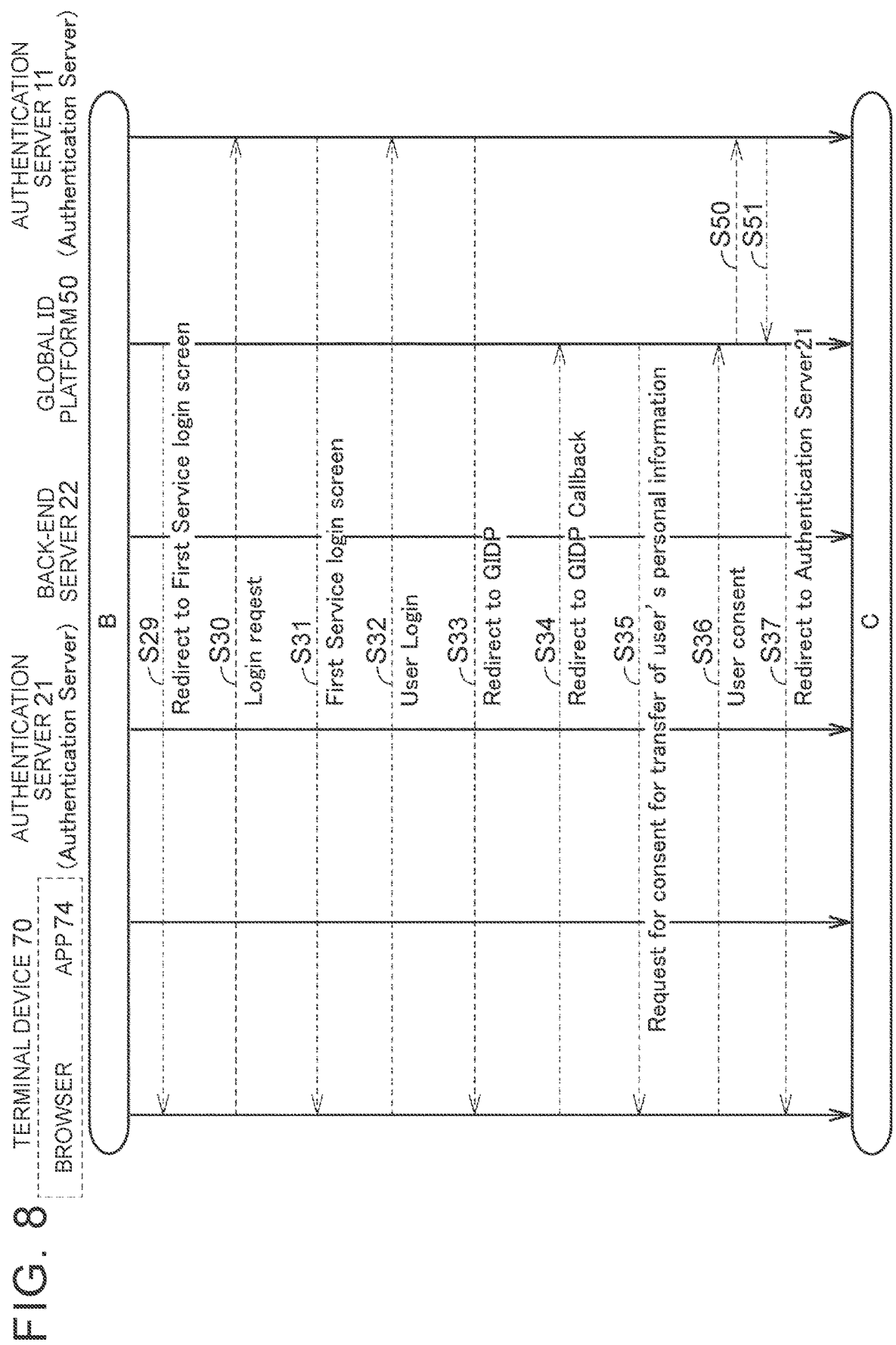
FIG. 8 is a flowchart (part 2) showing the procedure of the global login process.
Figure 9:
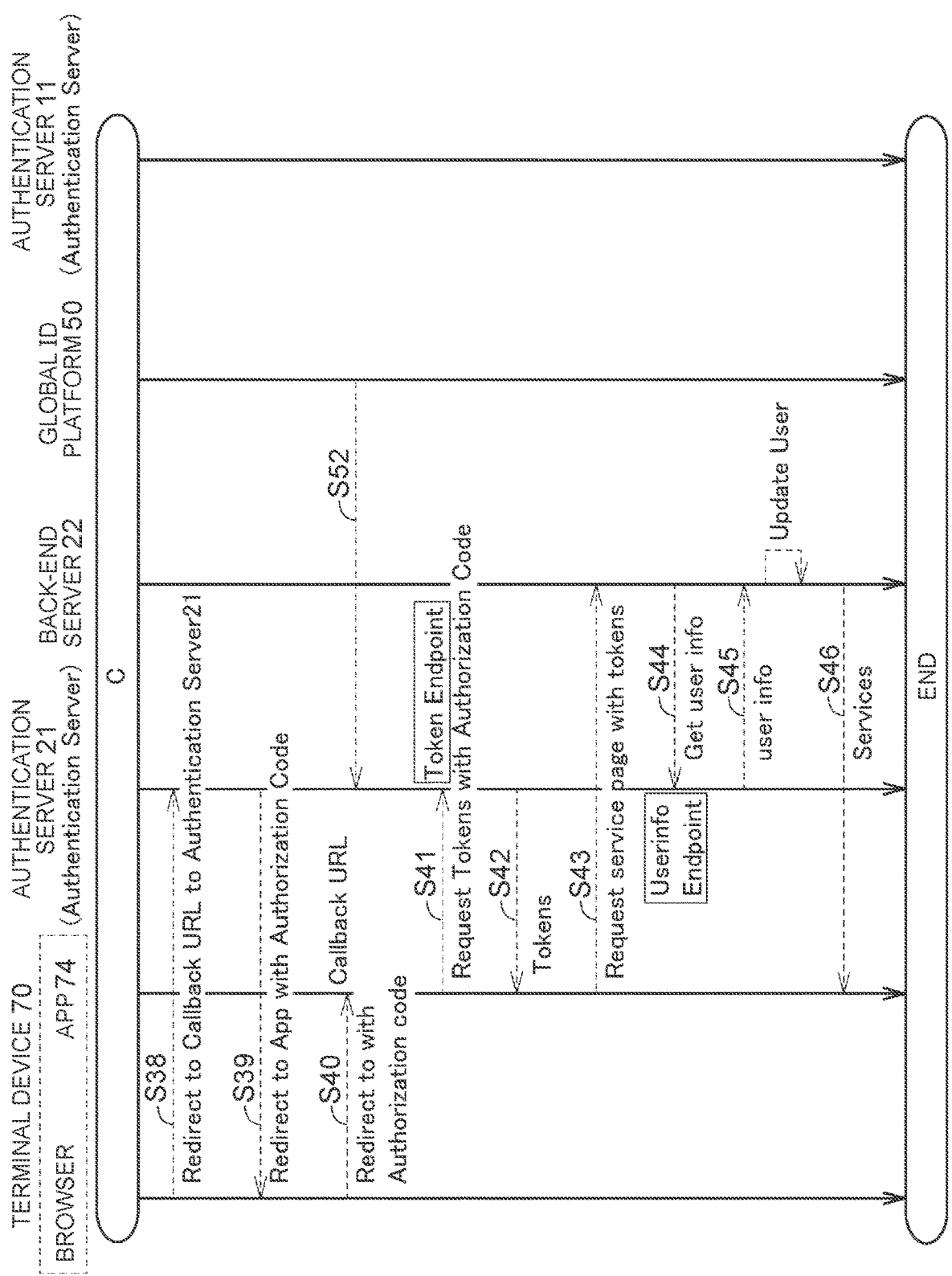
FIG. 9 is a flowchart (part 3) showing the procedure of the global login process.

FIG. 7 to FIG. 9 are flowcharts showing the procedure of a global login process. The processes of the flowcharts of FIG. 7 to FIG. 9 are started when the user 71 launches the application 74 on the terminal device 70. Steps in the flowcharts shown in FIG. 7 to FIG. 9 illustrate the case implemented by software processing on the terminal device 70, the authentication server 11 (the user information management unit 1111 and the authentication and authorization unit 1112), the authentication server 21 (global authentication unit 2113), the back-end server 22, and the global ID platform 50. Alternatively, one or some or all of the steps may be implemented by hardware (electronic circuit) prepared in the terminal device 70, the authentication server 11, the authentication server 21, the back-end server 22, and the global ID platform 50.

In S20, the user 71 launches the application 74 by operating the terminal device 70, and performs an operation for displaying a login screen on the display screen of the terminal device 70. The application 74 receives the operation.

When the application 74 receives the operation for displaying the login screen in S21 and S22, the application 74 makes a request of the authentication server 21 of the service providing system 20 to display the login screen via the browser of the terminal device 70. Specifically, in S21, the application 74 opens the browser of the terminal device 70 and redirects the browser to an authorization endpoint of the authentication server 21. In S22, the browser makes a request of the authorization endpoint of the authentication server 21 to display the login screen.

In S23, the authentication server 21 checks the details of the request and returns the login screen to the browser.

In S24, the user 71 selects a global login button 88 on the login screen. Thus, a request for global login is sent from the browser to the authentication server 21.

Figure 10:
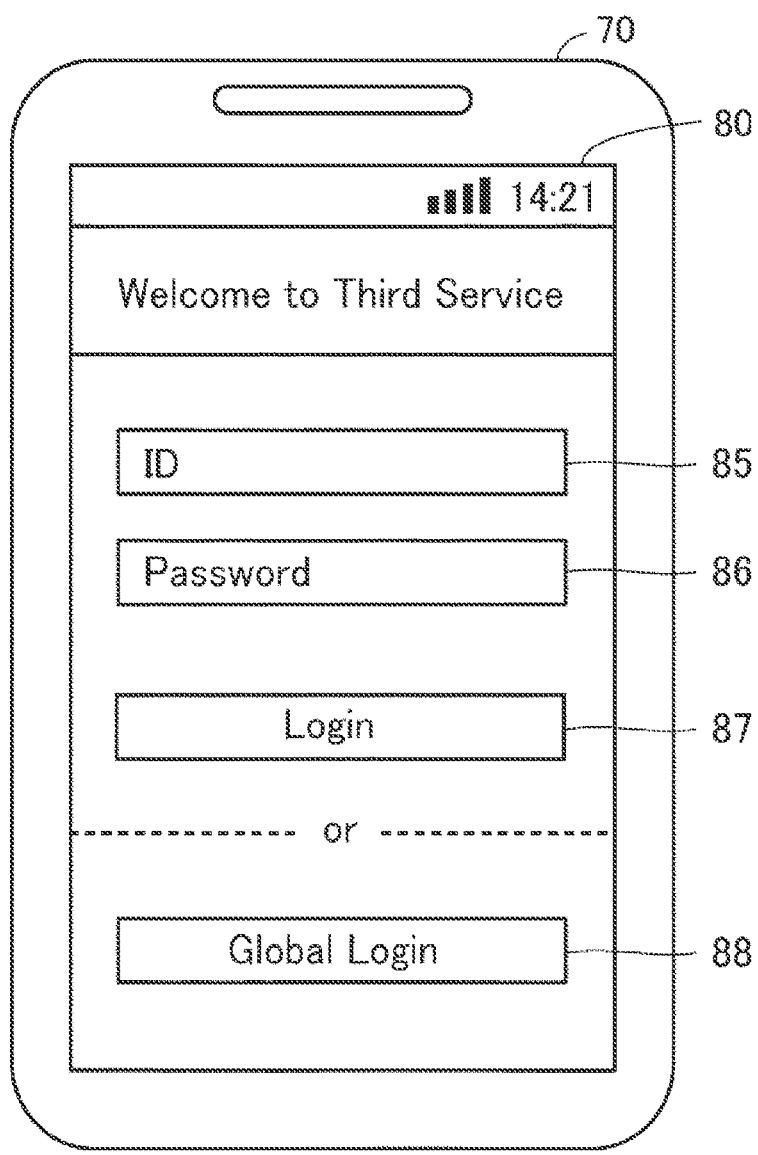
FIG. 10 is a view showing an example of a login screen for a third service, displayed on the terminal device.

FIG. 10 is a view showing an example of the login screen for the third service, displayed on the terminal device 70. In the present embodiment, the display configuration of the login screen for the third service is basically similar to the display configuration of the login screen for the first service. A user ID entry field 85, a password entry field 86, a login button 87, and the global login button 88 are displayed on the display unit 80 of the terminal device 70. The user ID entry field 85, the password entry field 86, and the login button 87 are similar to those illustrated in FIG. 6, and are used when the user 71 logs in to the third service by using the user ID and password issued to use the third service. When the user 71 is a member of the third service, the user 71 enters the user ID and the password for the third service respectively in the user ID entry field 85 and the password entry field 86 and presses the login button 87. In other words, the login button 87 is a button for direct authentication by the authentication server 21.

The global login button 88 is a button for logging in to the third service by using ID linkage. In other words, the global login button 88 is a button for logging in to the third service by using the user ID of another service other than the third service. In other words, the global login button 88 is a button for authentication by an authentication server other than the authentication server 21. As in the case of the present embodiment, the global login button 88 is used at the time when the user 71 who is not a member of the third service intends to log in to the third service. The login button 87 corresponds to one example of a first button according to the disclosure. The global login button 88 corresponds to one example of a second button according to the disclosure.

Referring back to FIG. 7 to FIG. 9, in S25, when the authentication server 21 receives the request for global login, the authentication server 21 redirects the browser to a global login endpoint of the global ID platform 50.

In S26, the browser makes a request of the global login endpoint of the global ID platform 50 for global login.

In S27, the global ID platform 50 checks the details of the request and returns a select page to the browser. The select page is a page for selecting the user ID used for global login. In the present embodiment, the user 71 uses the user ID of the first service, so the user 71 selects "Country A" and "First Service" on the select page.

Figure 11:
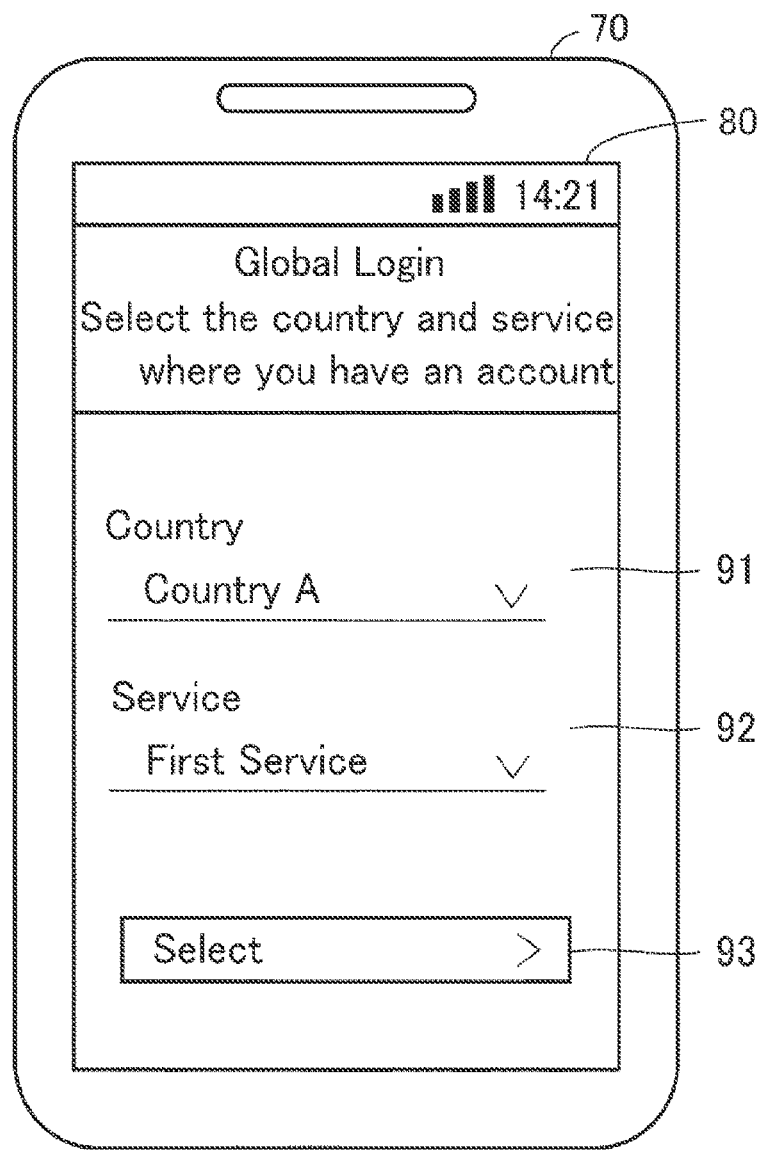
FIG. 11 is a view showing an example of a select page displayed on the terminal device.

FIG. 11 is a view showing an example of the select page displayed on the terminal device 70. A country select field 91, a service select field 92, and a select (set) button 93 are displayed on the display unit 80 of the terminal device 70. The user 71 selects the service of which the user ID is used to perform global login. Here, the user 71 performs global login to the third service by using the user ID of the first service in country A, so the user 71 selects country A in the country select field 91, selects the first service in the service select field 92, and presses the select button 93.

Referring back to FIG. 7 to FIG. 9, in S28, the information (country A and the first service) entered by the user 71 is sent to the global ID platform 50 as a request.

In S29, when the global ID platform 50 receives the request, the global ID platform 50 identifies the authentication server that performs authentication of the user ID used for global login based on the details of the request and redirects the browser to the authentication server. Specifically, the global ID platform 50 identifies the authentication server 11 of the service providing system 10 including the back-end server 12 that provides the first service, from the information, that is, "Country A" and "First Service". The global ID platform 50 redirects the browser to the authentication server 11. For example, the global ID platform 50 may identify the authentication server by using the correspondence information.

In S30, the browser makes a request of the authentication server 11 to display the login screen for the first service.

In S31, the authentication server 11 checks the details of the request and returns the login screen for the first service to the browser.

In S32, the user 71 enters the user ID and the password for the first service on the login screen. For example, the screen of FIG. 6 may be displayed as the login screen, or another screen for global login may be displayed as the login screen.

In S33, the authentication server 11 checks the entered user ID and password. As a result of the check, when the authentication server 11 determines that the user ID and the password are correct, the authentication server 11 returns the result of the check to the global ID platform 50. Specifically, the authentication server 11 redirects the browser to the global ID platform 50.

In S34, the browser accesses the global ID platform 50 with the result of the check.

In S33, when at least one of the user ID and the password is incorrect, the authentication server 11 returns the result of the check indicating that at least one of the user ID and the password is incorrect to the global ID platform 50.

In S35, the global ID platform 50 transmits, to the user 71 (browser), a request for consent to transfer the user information 1151 from the authentication server 11 to the authentication server 21. Thus, for example, a screen for seeking authorization to transfer the user information 1151 is displayed on the display unit 80 of the terminal device 70. The user 71 is able to consent to transfer the user information 1151 by pressing a consent button (not shown) displayed on the display unit 80.

In S36, the user 71 consents to transfer the user information 1151 and presses the consent button (not shown) displayed on the display unit 80 of the terminal device 70. Thus, information on the consent of the user 71 is sent from the browser to the global ID platform 50.

In S37 and S38, the global ID platform 50 transmits the consent information to the authentication server 21. Specifically, in S37, the global ID platform 50 redirects the browser to the authentication server 21. In S38, the browser accesses the authentication server 21 with the consent information.

In S39, the authentication server 21 redirects the browser to a callback URL with an authorization code. A transition destination of the callback URL is the application 74.

In S40, the browser accesses the application 74 that is the transition destination of the callback URL with the authorization code. Thus, the authorization code is transferred to the application 74.

In S41, the application 74 sends a token request to a token endpoint of the authentication server 21 with the authorization code received in S40.

In S42, the authentication server 21 checks the details of the token request and transmits tokens to the application 74. The tokens sent from the authentication server 21 to the application 74 include, for example, an access token, an ID token, and a refresh token.

In S43, the application 74 makes a request of the back-end server 22 for the provision of the third service with the access token and the ID token.

In S44, as the back-end server 22 receives the access token and the ID token, the back-end server 22 transmits the access token and the ID token to a user information endpoint of the authentication server 21.

In S45, the authentication server 21 checks the access token and the ID token and returns the user information 1151 of the user 71 to the back-end server 22.

In S46, the back-end server 22 starts providing the service to the user 71. In this way, the user 71 who is not a member of the third service is able to log in to the third service by using the user ID of the first service of which the user 71 is a member.

The user information 1151 of the user 71 is shared with the authentication server 21 via the global ID platform 50 through the processes of S50, S51, and S52 during a period after execution of the process of S36 and before execution of the process of S44. During the period after execution of the process of S36 and before execution of the process of S44, the global ID platform 50 acquires the user information 1151 of the user 71 from the authentication server 11 and transmits the acquired user information 1151 of the user 71 to the authentication server 21.

In S50, when information on the consent of the user 71 is obtained, the global ID platform 50 makes a request of the authentication server 11 to transmit the user information 1151 of the user 71.

In S51, the authentication server 11 reads the user information 1151 of the user 71 from the storage device 115 and transmits the read user information 1151 of the user 71 to the global ID platform 50.

In S52, the global ID platform 50 transmits the user information 1151 of the user 71 to the authentication server 21.

The processes of S50, S51, and S52 just need to be executed during the period between after execution of the process of S36 and before execution of the process of S44. The timing to execute the processes of S50, S51, and S52 is not limited to the timing shown in FIG. 7 to FIG. 9.

As described above, the authentication system 1 according to the present embodiment includes the global ID platform 50 that relays information and allows a global login that omits a direct exchange of information among authentication servers. Thus, a system capable of exchanging information between each authentication server and the global ID platform 50 just needs to be constructed, so it is possible to simplify the configuration of the system as compared to when a system that links IDs by directly exchanging information between authentication servers of service providing systems is constructed.

The login button (for example, the login button 83 or the login button 87) and the global login button (for example, the global login button 84 or the global login button 88) are displayed on the login screen for each service (for example, the first service or the third service) displayed on the display unit 80 of the terminal device 70. Since two buttons are displayed, the user 71 is able to visually recognize to press the login button when logging in to a service of which the user 71 is a member and to press the global login button when performing a global login to a service of which the user 71 is not a member. Since the login button and the global login button are displayed on the login screen, it is possible to improve the convenience of the user 71.

First Modification

In the embodiment, the example in which an authentication server stores user information and manages the user information has been described. However, the function of managing user information may be imparted to a server different from an authentication server.

Figure 12:
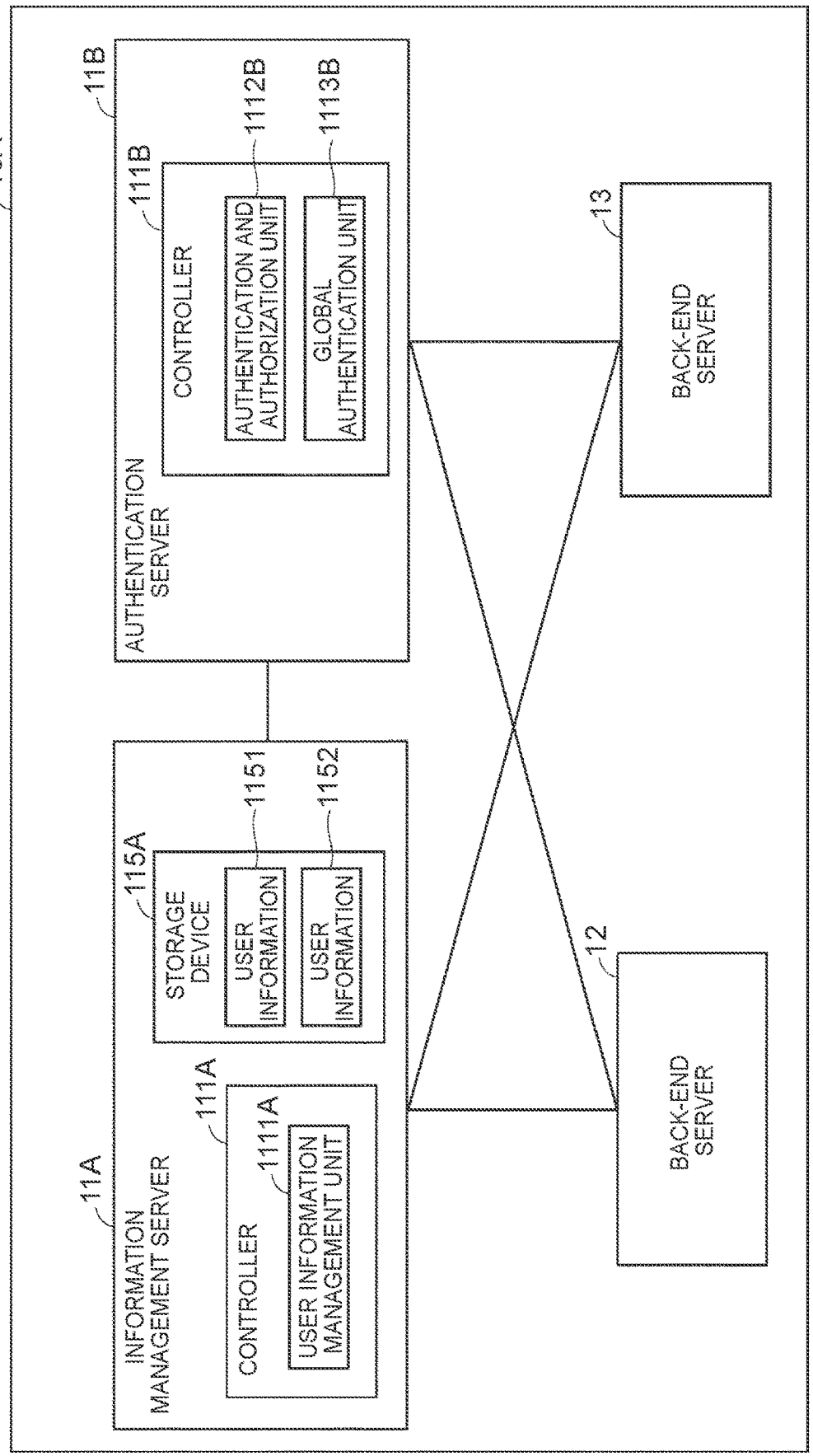
FIG. 12 is a diagram schematically showing the configuration of a service providing system according to a first modification.

FIG. 12 is a diagram schematically showing the configuration of a service providing system 10A according to a first modification. The service providing system 10A substitutes for the service providing system 10 according to the embodiment. Hereinafter, the configuration of the service providing system 10A will be typically described; however, a similar configuration may be employed for the service providing systems of countries B to D.

The service providing system 10A includes an information management server 11A, an authentication server 11B, and the back-end servers 12, 13.

The information management server 11A includes a controller 111A, a ROM, a RAM, a communication device, and a storage device 115A. In FIG. 12, the ROM, the RAM, and the communication device are not shown.

The controller 111A includes a user information management unit 1111A. The controller 111A, for example, functions as the user information management unit 1111A by running a program stored in the ROM. The user information management unit 1111A may be implemented by, for example, dedicated hardware (electronic circuit).

The user information management unit 1111A has a similar function to the user information management unit 1111 according to the embodiment.

The storage device 115A is similar to the storage device 115 according to the embodiment. The storage device 115A stores the pieces of user information 1151, 1152.

The authentication server 11B includes a controller 111B, a ROM, a RAM, a communication device, and a storage device. In FIG. 12, the ROM, the RAM, the communication device, and the storage device are not shown. The storage device of the authentication server 11B does not store the pieces of user information 1151, 1152.

The controller 111B includes an authentication and authorization unit 1112B and a global authentication unit 1113B. The controller 111B, for example, functions as the authentication and authorization unit 1112B, and the global authentication unit 1113B by running programs stored in the ROM. The authentication and authorization unit 1112B and the global authentication unit 1113B may be implemented by, for example, dedicated hardware (electronic circuit).

The authentication and authorization unit 1112B and the global authentication unit 1113B respectively have similar functions to the authentication and authorization unit 1112 and the global authentication unit 1113 according to the embodiment.

When the configuration of the service providing system 10A is employed in the authentication system 1 as well, similar advantageous effects to those of the embodiment are obtained.

Second Modification

In the embodiment, the example in which one authentication server (for example, the authentication server 11) is provided for a plurality of back-end servers (for example, the back-end servers 12, 13) has been described; however, an authentication server may be provided for each back-end server. In this case as well, each authentication server exchanges information with another authentication server via a global ID platform, so similar advantageous effects to those of the embodiment are obtained.

The embodiment described above is illustrative and not restrictive in all respects. The scope of the disclosure is not defined by the description of the above-described embodiments, and is defined by the appended claims. The scope of the disclosure is intended to encompass all modifications within the scope of the appended claims and equivalents thereof

What is claimed is:
1. An authentication system comprising:
a terminal device configured to be operated by a user;

a first server configured to store identification information for identifying the user;

a second server configured to not store the identification information; and a platform configured to relay information between the first server and the second server, the platform is separate from each of the terminal device, the first server, and the second server, the first server and the second server being configured not to communicate directly with each other, wherein the platform is configured to, when there is an authentication request of the user from the terminal device to the second server, relay the authentication request from the second server to the first server, and relay an authentication result, returned by the first server for the authentication request, from the first server to the second server, wherein the authentication request regards a login request of the user that is predetermined by the first server to be successfully authenticated before the platform relays the authentication request from the second server to the first server, and wherein the authentication request further regards a consent of the user to transfer information of the user between the first server and the second server.

2. The authentication system according to claim 1, wherein:

the terminal device includes a display unit;

the terminal device is configured to display a page for authentication on the display unit;

the page contains a first button and a second button;

authentication of the user is performed without using the platform based on the first button being pressed; and the authentication request is relayed by the platform based on the second button being pressed.

3. The authentication system according to claim 1, wherein the platform is configured to, when the authentication result indicates that authentication is successful, transmit, to the terminal device, a consent request for consent to share the identification information to the second server, and when the consent to the consent request is obtained from the terminal device, relay the identification information from the first server to the second server.

4. The authentication system according to claim 3, wherein the second server is configured to, when the consent to the consent request is obtained from the terminal device, transmit an authorization code to the terminal device.

5. The authentication system according to claim 4, wherein the terminal device is configured to transmit the authorization code to the second server and acquire at least one of an access token and an ID token from the second server.

6. An authentication system comprising:

a terminal device configured to be operated by a user;

a first server configured to store identification information for identifying the user;

a second server configured to not store the identification information; and a platform configured to relay information between the first server and the second server, the platform is separate from each of the terminal device, the first server, and the second server, the first server and the second server being configured not to communicate directly with each other, wherein the platform is configured to, when there is an authentication request of the user from the terminal device to the second server, relay the authentication request from the second server to the first server, and relay an authentication result, returned by the first server for the authentication request, from the first server to the second server, and wherein the authentication request regards a login request of the user that is predetermined by the first server to be successfully authenticated before the platform relays the authentication request from the second server to the first server, wherein the first server is configured to provide a first service in a first country, and wherein the second server is configured to provide a second service in a second country, wherein the first country is different than the second country, and wherein the first service is different than the second service, wherein the authentication request further regards a consent of the user to transfer information of the user between the first server of the first country and the second server of the second country.

* * * * *